United States Patent

Amano et al.

Patent Number: 5,848,757
Date of Patent: Dec. 15, 1998

[54] SPINNING REEL WITH IMPROVED BAIL MOUNTING MEMBER

[75] Inventors: Tomoyuki Amano, Saitama; Eiji Shinohara, Tokyo, both of Japan

[73] Assignee: Daiwa Seiko, Inc., Tokyo, Japan

[21] Appl. No.: 864,991

[22] Filed: May 29, 1997

[30] Foreign Application Priority Data

Jun. 12, 1996 [JP] Japan .................................. 8-173096

[51] Int. Cl.⁶ .................................................. A01K 89/015
[52] U.S. Cl. .......................................................... 242/231
[58] Field of Search .................................. 242/230, 231, 242/232, 233

[56] References Cited

U.S. PATENT DOCUMENTS

| | | | |
|---|---|---|---|
| 3,670,984 | 6/1972 | Lemery | 242/231 |
| 5,261,627 | 11/1993 | Shinohara | 242/231 |
| 5,673,867 | 10/1997 | Takeuchi | 242/231 |

FOREIGN PATENT DOCUMENTS

| | | | |
|---|---|---|---|
| 36 04 700 | 8/1987 | Germany | 242/231 |
| 40 04 218 | 8/1991 | Germany | 242/231 |
| 3-117462 | 12/1991 | Japan . | |
| 4-65068 | 6/1992 | Japan . | |

*Primary Examiner*—Katherine Matecki
*Attorney, Agent, or Firm*—Sughrue, Mion, Zinn, Macpeak & Seas, PLLC

[57] ABSTRACT

A fishing spinning reel with a supporting member for supporting a line roller and a bail mounting member for connecting a bail to the supporting member. The bail mounting member has guide walls that prevent the fishing line from being twined around the bail mounting member and that disengage twined line from the bail mounting member. A hollow space is defined between the guide walls for reducing the weight of the bail mounting member to facilitate balancing of the fishing reel.

6 Claims, 5 Drawing Sheets

SPINNING REEL WITH IMPROVED BAIL MOUNTING MEMBER

BACKGROUND OF THE INVENTION

1. Field of the Invention

This invention relates to fishing spinning reels, and more particularly to the structure of the bail mounting member of a fishing spinning reel.

2. Description of the Related Art

Japanese Utility Model Unexamined Publication No. Hei. 4-65068 discloses a spinning reel in which a bail supporting member having a line guide section for guiding a fishing line is supported at the end of a rotor, which is rotated in association with a handle, in such a manner that the bail supporting member is switchable between a line take-up position and a line let-out position. However, when the rotor is rotated after the bail is switched from the line let-out position to the line take-up position, the fishing line may be twined around the line guide section. It then becomes impossible to take up the fishing line, and in a worst case scenario, the fishing line may be broken.

In order to overcome this difficulty, Japanese Utility Model Unexamined Publication No. Hei. 3-117462 discloses a spinning reel having a bail mounting section 6 with a line guide 11 having a line-twining preventing portion 12, as shown in FIG. 9. The bail mounting section 6 connects the bail 5 to a supporting member 3 which rotatably supports a line roller 8 by a screw 7.

However, in this spinning reel, the bail mounting section 6 is relatively large in thickness, and therefore the front portion of the reel is correspondingly heavy in weight, particularly at the end of the bail on the line roller side. Hence, it is difficult to make the balance in rotation of the rotor uniform.

SUMMARY OF THE INVENTION

Accordingly, an object of the invention is to provide a spinning reel in which the fishing line is effectively prevented from being twined around the line guide section, while at the same time improving the balance in rotation of the rotor to also improve operability of the reel.

The foregoing object of the invention is achieved by providing a bail mounting member for connecting a bail to a supporting member of a fishing spinning reel, the supporting member being pivotable between fishing line take-up and let-out positions, the bail mounting member including guide walls that extend from the bail toward the supporting member, a hollow space being defined between the guide walls for reducing the weight of the bail mounting member to facilitate balancing of the fishing spinning reel.

More particularly, the fishing spinning reel of the invention includes: a reel body; a spool supported on the reel body; a rotor rotatably supported on the reel body for winding a fishing line around the spool; a supporting member connected to the rotor and movable between a fishing line take-up position and a fishing line let-out position; a line roller for guiding the fishing line onto the spool, the line roller being rotatably mounted on the supporting member; a bail for retrieving the fishing line; and a bail mounting member for connecting the bail to the supporting member, the bail mounting member having a first end connected to the bail and a second end connected to the supporting member, wherein the bail mounting member includes guide walls that extend from the bail toward the supporting member, a hollow space being defined between the guide walls for reducing the weight of the bail mounting member to facilitate balancing of the fishing spinning reel.

BRIEF DESCRIPTION OF THE DRAWING FIGURES

Figure 6:
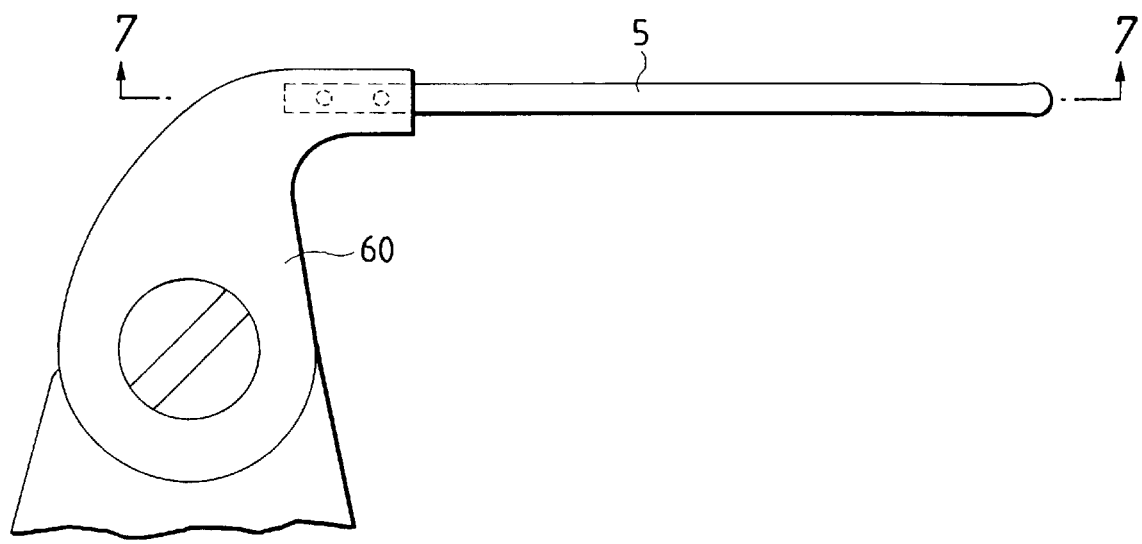
FIG. 6 is an explanatory diagram showing an example of a bail mounting structure in the spinning reel of the invention.
Figure 7:
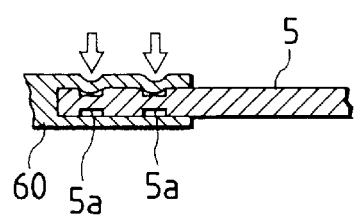
Figure 8:
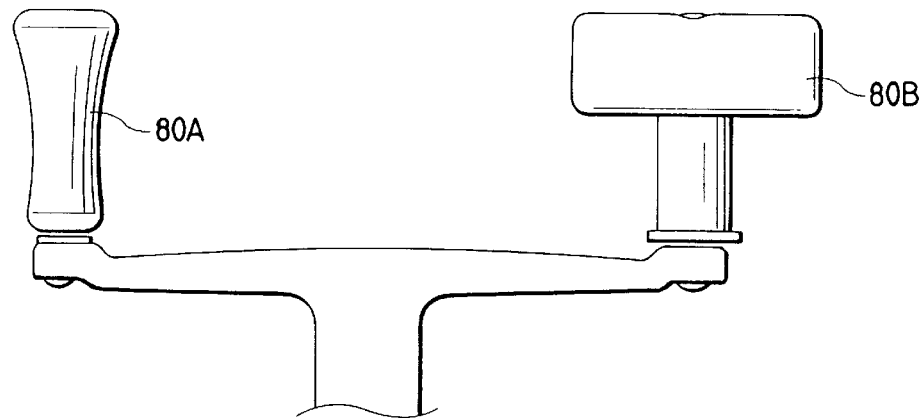
Figure 9:
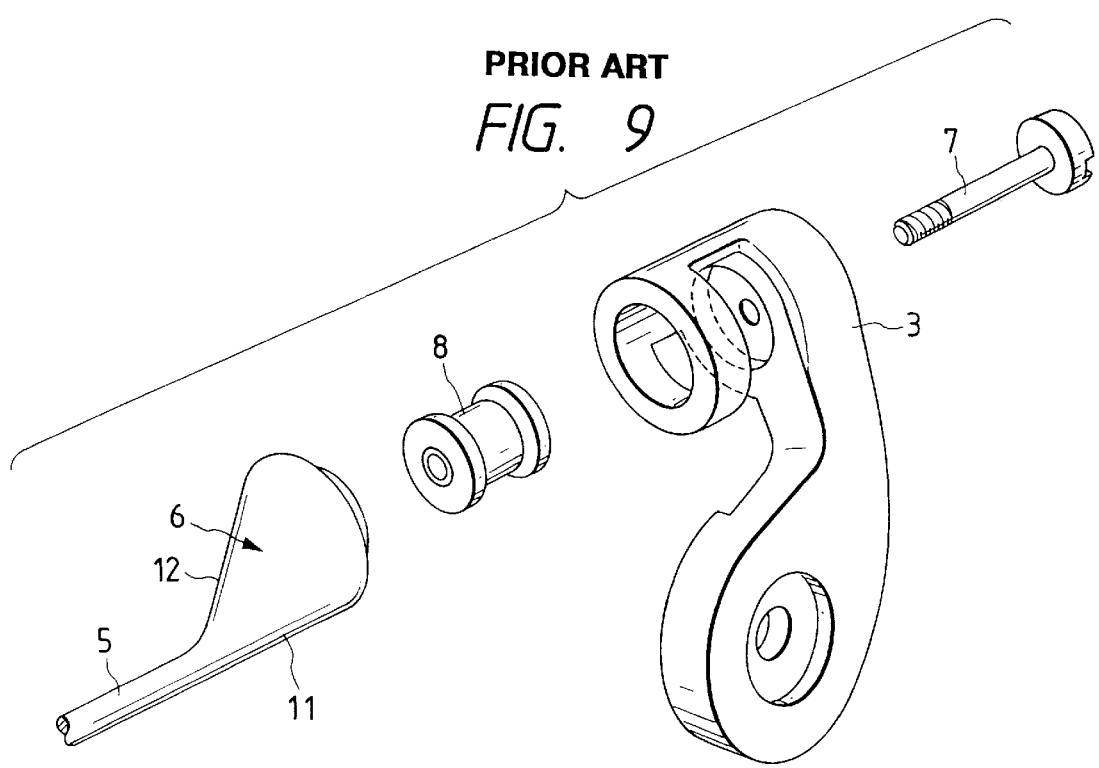

FIG. 7 As a sectional view taken along line 7—7 in FIG. 6;

FIG. 8 is an explanatory diagram showing an example of a handle knob mounting structure in the spinning reel of the invention; and FIG. 9 is an exploded perspective view showing essential components of a known bail mounting assembly according to JP 3-117462.

DETAILED DESCRIPTION OF THE PREFERRED EMBODIMENTS

Preferred embodiments of the invention will be described with reference to the accompanying drawings.

Figure 1:
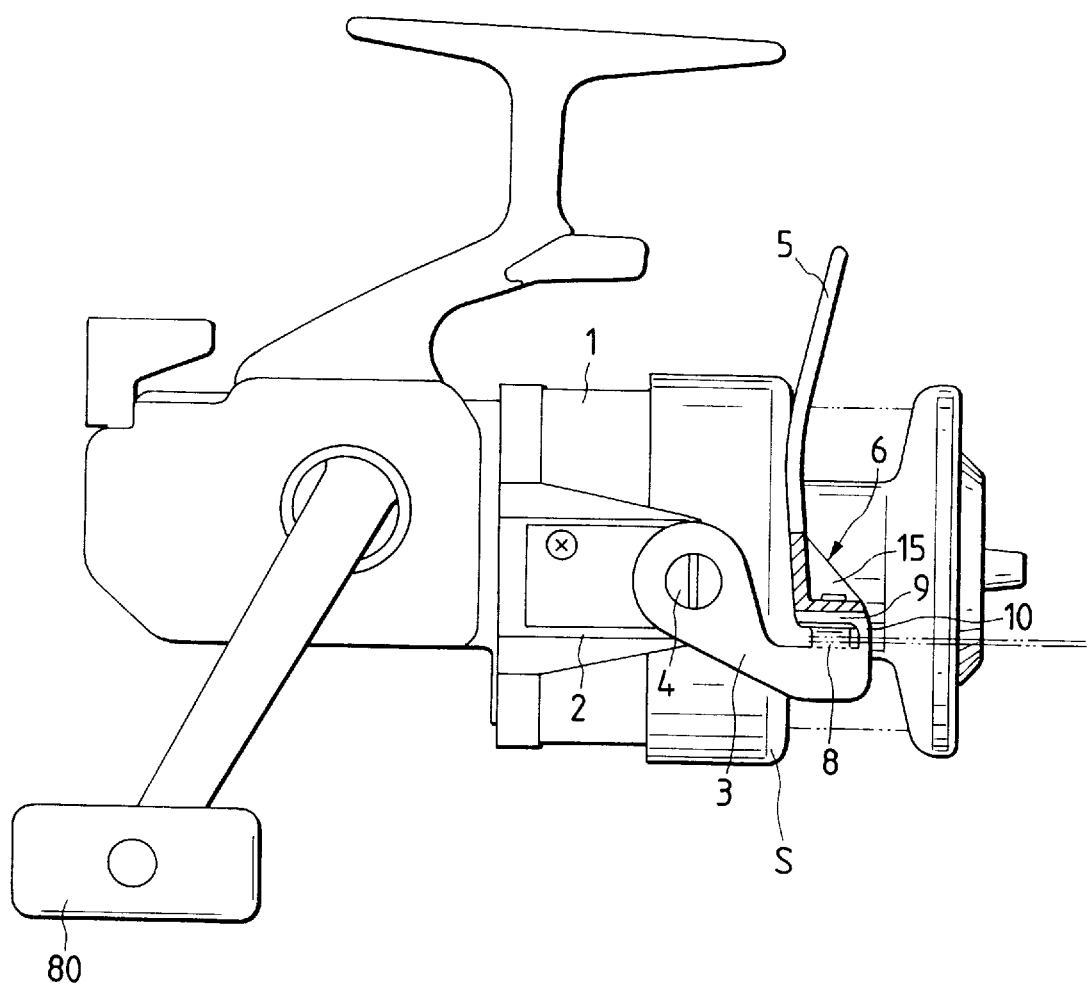
FIG. 1 is a side view of a spinning reel according to a first embodiment of the invention.
Figure 2:
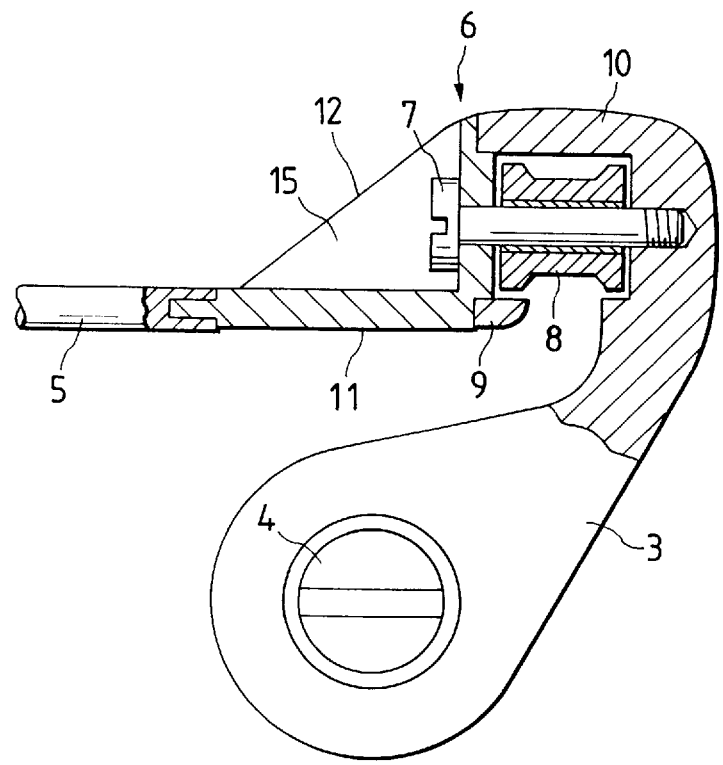
FIG. 2 is a sectional view showing essential components of the first embodiment.
Figure 3:
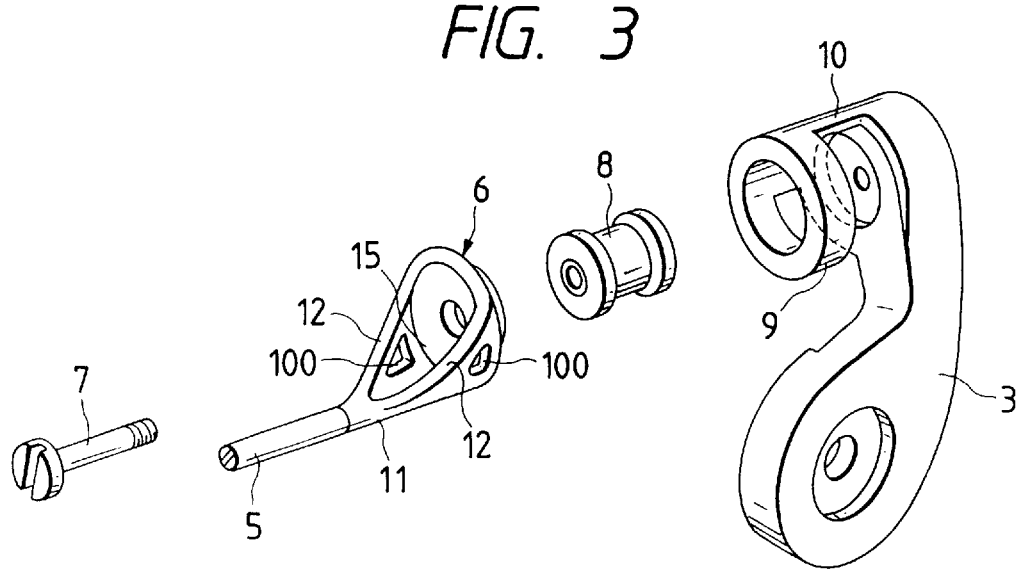
FIG. 3 is an exploded perspective view showing essential components of the first embodiment.

In the spinning reel of the first embodiment of the invention, as shown in FIGS. 1 through 3, a supporting arm 2 is provided so as to extend from a base end portion of a rotor 1, and a supporting member 3 is rotatably mounted on the front end portion of the supporting arm 2 by a pin 4. A line roller 8 is rotatably secured between the end portion of the supporting member 3 and the mounting member 6 of a bail 5 (hereinafter referred to as "a bail mounting member 6", when applicable) by a screw 7. An annular frame 9, which is fitted on the end face of the bail mounting section 6, is formed integrally with the supporting member 3 through a frame 10 provided in front of the line roller 8.

The bail mounting member 6 is formed so that the bail 5 extends in the axial direction of the screw 7 and is off-centered toward the side of the supporting arm 2, that is, toward the opposite direction of the fishing line let-out direction, with respect to the axial direction of the screw 7. The bail mounting member 6 has a line guide 11 which is substantially flush with the bail 5 and guide walls 12 which are obliquely expanded in the fishing line let-out direction from the bail 5 towards the outer periphery of the annular frame 9. The surface of the guide walls 12 is substantially flush with the peripheral surface of the annular frame 9. A hollow space 15 is defined between the guide walls 12, which results in a significant decrease in the weight of the line guide 11. This facilitates balancing of the rotor without sacrificing the line-twining prevention characteristics. The guide walls 12 may have one or more through-holes 100 in order to decrease the weight of the bail mounting member 6 even further. The through-holes 100 should be positioned so as not to obstruct the fishing line as it slides along the guide walls 12. Additionally, if the guide walls 12 have the through-holes 100 at the both side thereof, as shown in FIG. 3, the through-holes 100 provided on the near side of the spool S may be designed wider than the through-holes 100 provided on the far side of the spool S.

When the rotor 1 is turned with the handle after the bail 5 is switched from the line let-out position to the line take-up position, the fishing line let out is scooped with the bail 5, and is led to the line roller 8 while being guided by the line guide 11 of the bail mounting member 6 which is substantially flush with the bail 5, thus being wound on the spool S. In this case, even if the fishing line is twined around the bail mounting member 6 because it is slackened by the change in tension or because it is a curly fishing line, the twined fishing ling slides along the guide walls 12 and is disengaged from the bail mounting member 6; that is, the fishing line is prevented from twining around the bail mounting member 6.

A second embodiment of the invention is described next.

Figure 4:
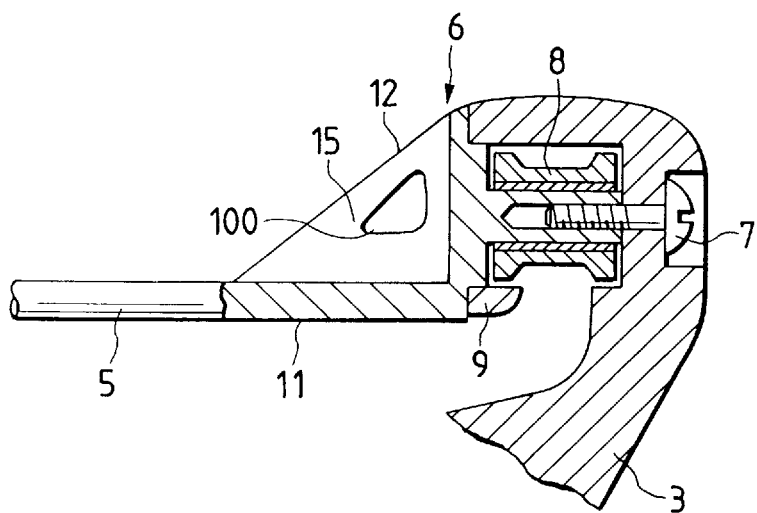
FIG. 4 is a sectional-view showing essential components of a second embodiment of the invention.

In the first embodiment, the screw 7 for securing the bail mounting member 6 to the supporting member 3 is inserted from the bail mounting member side. However, in the second embodiment, as shown in FIG. 4, the insertion of the screw 7 is made from the supporting member side. Furthermore, in the second embodiment, the screw 7 is threadably inserted from outside the supporting member 3. Hence, this embodiment includes guide walls 12 and a hollow space 15 similar to the first embodiment. In the second embodiment, as in the first embodiment, through-holes 100 may be formed in the walls of the hollow, in order to decrease the weight of the bail mounting member 6.

Figure 5:
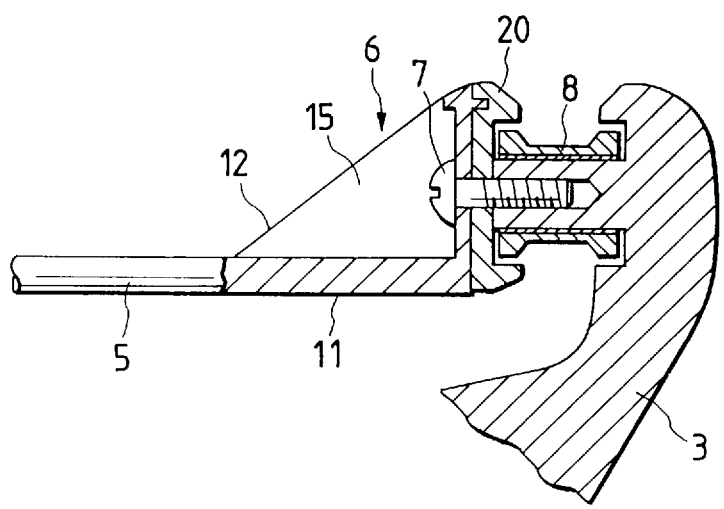
FIG. 5 is a sectional view showing essential components of a third embodiment of the invention.

In the above-described first and second embodiments, the portion of the supporting member 3 where the line roller 8 is attached is opened only towards the line guide 11. However, it may be opened around the line roller 8 as shown in FIG. 5. In this case, a disk-shaped cover 20 is provided to cover the end face of the line roller 8 which is opposite to the end face on the supporting member side. In the case of FIG. 5, the cover 20 is a component separate from the bail mounting member 6. However, the cover 20 and the bail mounting member 6 may be formed integrally with each other, i.e., as a single piece.

In the above-described embodiments, the bail 5 is coupled at one end to the supporting member 3 that supports the line roller 8 in the above-described manner. The other end of the bail 5 could be readily and positively coupled to another supporting member 60 on the side which is opposite to the side where the line roller is provided, as shown in FIGS. 6 and 7, although different connections are possible and the invention is not intended to be limited thereto or thereby. In FIGS. 6 and 7, a plurality of annular grooves 5a are formed in an end portion of the bail 5, and the end portion is inserted into a mounting hole formed in the supporting member 60. Portions of the supporting member 60 where the mounting hole is formed are punched from the outside, so that these portions of the supporting member 60 are pressed into the annular grooves 5a, whereby the bail 5 is positively secured to the supporting member 60.

In the embodiment shown in FIG. 1, the fishing reel may be a single knob type, i.e., the fishing reel may have only one knob 80. However, the invention is not intended to be limited thereto or thereby. That is, the technical concept of the invention may be applied to a fishing reel of a double knob type. Further the knobs may be different in configuration, as for example the knobs 80A and 80B shown in FIG. 8. The knob 80A is a so-called "I-shaped knob", which is suitable when catching small fish where the load is light, and the line winding operation is carried out quickly. The knob 80B is a so-called "T-shaped knob", which is suitable when catching large fish where the line winding operation is carried out under a heavy load. The two different knobs may be selectively used according to the size of the fish, and therefore the fishing reel of this type can be used for catching a variety of different size fish.

As described above, the fishing spinning reel of the invention has guide walls which effectively prevent the fishing line from twining around the line guide section. A hollow space is defined between the guide walls to reduce the weight of the bail mounting member, thereby minimizing a shift in the center of gravity. The rotor is therefore more balanced during rotation. The resultant spinning reel is excellent in operability.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. A fishing spinning reel comprising:

a reel body;

a spool supported on said reel body;

a rotor rotatably supported on said reel body for winding a fishing line around said spool;

a bail supporting member connected to the rotor and movable between a fishing line take-up position and a fishing line let-out position;

a line roller for guiding the fishing line onto said spool, said line roller being rotatably mounted on said bail supporting member;

a bail for retrieving the fishing line; and a bail mounting member for connecting said bail to said bail supporting member, said bail mounting member having a first end connected to said bail and a second end connected to said bail supporting member, wherein said bail mounting member comprises:

guide walls for guiding the fishing line from said bail to said line roller, a hollow space being defined between said guide walls for reducing the weight of said bail mounting member to facilitate balancing of the fishing spinning reel.

2. A fishing spinning reel according to claim 1, wherein said bail mounting member further comprises a line guide which is substantially flush with said bail, and wherein said guide walls and said line guide together define a substantially U-shaped section in a section substantially transverse to an axis of rotation of said line roller, said U-shaped section gradually increasing in size from said bail towards said bail supporting member.

3. A fishing spinning reel according to claim 1, wherein at least one of said guide walls has a through-hole for reducing the weight of said bail mounting member.

4. A fishing spinning reel according to claim 1, further comprising a screw for mounting said line roller on said bail supporting member.

5. A fishing spinning reel as recited in claim 4, wherein said screw is inserted in a screw hole that opens to the hollow portion in said bail mounting member.

6. A fishing spinning reel as recited in claim 5, further comprising a cover member that covers an end face of said line roller, said cover member being disposed between said bail mounting member and said bail supporting member.

* * * * *